(12) United States Patent
Seregin et al.

(10) Patent No.: US 10,638,140 B2
(45) Date of Patent: Apr. 28, 2020

(54) SLICE LEVEL INTRA BLOCK COPY AND OTHER VIDEO CODING IMPROVEMENTS

(71) Applicant: QUALCOMM Incorporated, San Diego, CA (US)

(72) Inventors: Vadim Seregin, San Diego, CA (US); Krishnakanth Rapaka, San Diego, CA (US); Cheng-Teh Hsieh, Del Mar, CA (US); Rajan Laxman Joshi, San Diego, CA (US); Ye-Kui Wang, San Diego, CA (US); Chao Pang, Marina del Rey, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 258 days.

(21) Appl. No.: 15/158,741

(22) Filed: May 19, 2016

(65) Prior Publication Data

US 2016/0353117 A1  Dec. 1, 2016

Related U.S. Application Data

(60) Provisional application No. 62/168,396, filed on May 29, 2015.

(51) Int. Cl.
*H04B 1/66* (2006.01)
*H04N 7/12* (2006.01)
(Continued)

(52) U.S. Cl.
CPC ......... *H04N 19/174* (2014.11); *H04N 19/103* (2014.11); *H04N 19/105* (2014.11);
(Continued)

(58) Field of Classification Search
CPC .......................... H04N 19/159; H04N 19/174
See application file for complete search history.

(56) References Cited

U.S. PATENT DOCUMENTS 9,066,102 B2   6/2015  Chen et al.
2005/0133244 A1  6/2005  Devine et al.
(Continued)

FOREIGN PATENT DOCUMENTS

CN   104539949 A   4/2015
CO     6862115 A2   2/2014
(Continued)

OTHER PUBLICATIONS

Li et al.: "Non-SCCE1: Unification of intra BC and inter modes",18. JCT-VC Meeting; Jun. 30, 2014-Sep. 7, 2014; SAPPORO; (Year: 2014).*

(Continued)

*Primary Examiner* — Fabio S Lima
(74) *Attorney, Agent, or Firm* — Shumaker & Sieffert, P.A.

(57) ABSTRACT

A device for decoding video data includes a memory configured to store the video data and one or more processors configured to receive a slice of the video data, parse an intra block copy (IBC) syntax element to determine that an IBC mode is enabled for the slice, parse a slice type syntax element associated with the slice to determine the slice is an I slice, and decode the slice as an I slice by decoding all blocks of the slice using intra prediction coding modes.

19 Claims, 7 Drawing Sheets

(51) Int. Cl.

| | |
|---|---|
| *H04N 11/02* | (2006.01) |
| *H04N 11/04* | (2006.01) |
| *H04N 19/174* | (2014.01) |
| *H04N 19/105* | (2014.01) |
| *H04N 19/139* | (2014.01) |
| *H04N 19/513* | (2014.01) |
| *H04N 19/70* | (2014.01) |
| *H04N 19/103* | (2014.01) |
| *H04N 19/593* | (2014.01) |

(52) U.S. Cl.
CPC ......... *H04N 19/139* (2014.11); *H04N 19/521* (2014.11); *H04N 19/70* (2014.11); *H04N 19/593* (2014.11)

(56) References Cited

U.S. PATENT DOCUMENTS

| | | | | |
|---|---|---|---|---|
| 2008/0205784 | A1* | 8/2008 | Akgun | G06T 3/403 382/254 |
| 2013/0114742 | A1* | 5/2013 | Hannuksela | H04N 19/46 375/240.25 |
| 2015/0063440 | A1 | 3/2015 | Pang et al. | |
| 2016/0198167 | A1* | 7/2016 | Lee | H04N 19/30 375/240.12 |
| 2017/0142418 | A1* | 5/2017 | Li | H04N 19/159 |
| 2017/0318302 | A1* | 11/2017 | Ye | H04N 19/186 |

FOREIGN PATENT DOCUMENTS

| | | |
|---|---|---|
| WO | 2005022714 A2 | 3/2005 |
| WO | 2012067966 A1 | 5/2012 |
| WO | 2015192353 A1 | 12/2015 |

OTHER PUBLICATIONS

Sullivan, Gary J., et al. "Overview of the high efficiency video coding (HEVC) standard." IEEE Transactions on circuits and systems for video technology 22.12 (2012): 1649-1668 (Year: 2012).*

ITU-T H.265, Series H: Audiovisual and Multimedia Systems, Infrastructure of audiovisual services—Coding of moving rideo, Advanced video coding for generic audiovisual services, The International Telecommunication Union. Oct. 2014. (Year: 2014).*

Flynn D., et al., "Range Extensions Draft 4," JCT-VC Meeting, Apr. 18-26, 2013, Vienna, (Joint Collaborative Team on Video Coding of ISO/IEC JTC1/SC29/WG11 and ITU-T SG.16 ); URL: http://wftp3.itu.int/av-arch/jctvc-site/, No. JCTVC-N1005_v1, Aug. 7, 2013, 84 pp.

International Search Report and Written Opinion of International Application No. PCT/US2016/033553, dated Jul. 13, 2016, 14 pp.

Li et al., "Non—SCCE1: Unification of Intra BC and Inter Modes," 18th Meeting; Jun. 30-Jul. 9, 2014; Sapporo, JP; (Joint Collaborative Team on Video Coding of ISO/IEC JTC1/SC29/WG11 and ITU-T SG.16 ); URL: http://wftp3.1tu.int/av-arch/jctvc-site/. No. JCTVC-R0100, Jun. 20, 2014, 27 pp.

Rapaka K., et al., "HLS: On Intra Block Copy Signaling Control," JCT-VC Meeting, Jun. 19, 2015-Jun. 26, 2015; Warsaw, (Joint Collaborative Team on Video Coding of ISO/IEC JTC1/SC29/WG11 and ITU-T SG.16), URL: http://wftp3.itu.int/av-arch/jctvc-site/, No. JCTVC-U0079-r1, Jun. 15, 2015, 5 pp.

Seregin V., et al., "On Intra Block Copy Bitstream Constraints," 21.JCT-VC Meeting, Jun. 19, 2015-Jun. 26, 2015, Warsaw, (Joint Collaborative Team on Video Coding of ISO/IEC JTC1/SC29/WG11 and ITU-TSG.16), URL: http://wftp3.itu.int/av-arch/jctvc-site/, No. JCTVC-U0118, Jun. 19, 2015, 5 pp.

Xu X., et al., "On Unification of Intra Block Copy and Inter-picture Motion Compensation," JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0132-v5, Apr. 3, 2014, 14 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Flynn et al., "High Efficiency Video Coding (HEVC) Range Extensions text specification: Draft 7," Joint Collaborative Team on Video Coding (JCT-VC) of ITU-T SG 16 WP 3 and ISO/IEC JTC 1/SC 29/WG 11 17th Meeting: Valencia, Mar. 27-Apr. 4, 2014 ES, JCTVC-Q1005_v4, Apr. 10, 2014, 379 pp.

Wang et al., "High Efficiency Video Coding (HEVC) Defect Report 4," Joint Collaborative Team on Video Coding (JCT-VC) of ITU-T SG 16 WP 3 and ISO/IEC JTC 1/SC 29/WG 11 17th Meeting: Valencia, Mar. 27-Apr. 4, 2014, JCTVC-Q1003_v1, May 27, 2014, 314 pp.

ITU-T H.223, Series H: Audiovisual and Multimedia Systems, Infrastructure of audiovisual services—Transmission multiplexing and synchronization, The International Telecommunication Union. Jul. 2011, 74 pp.

Wiegand et al., "WD1: Working Draft 1 of High-Efficiency Video Coding," JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_v2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_v7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2013, 317 pp.

(56) References Cited

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
Yu et al., "Requirements for an extension of HEVC for coding of screen content," ISO/IEC JTC 1/SC 29/WG 11 Requirements subgroup, MPEG2013/N14174, San Jose, Jan. 2014, 5 pp.
Joshi et al., "High Efficiency Video Coding (HEVC) Screen Content Coding: Draft 3," Joint Collaborative Team on Video Coding (JCT-VC) of ITU-T SG 16 WP 3 and ISO/IEC JTC 1/SC 29/WG 11 20th Meeting: Geneva, CH Feb. 10-Feb. 17, 2016, JCTVC-T1005, Apr. 5, 2015, 567 pp.
Lainema et al., "AHG10: Memory bandwidth reduction for intra block copy," Joint Collaborative Team on Video Coding (JCT-VC) of ITU-T SG 16 WP 3 and ISO/IEC JTC 1/SC 29/WG 11 20th Meeting: Geneva, CH, Feb. 10-18, 2015, JCTVC-T0045, Jan. 30, 2015, 3 pp.
Wang et al., "High Efficiency Video Coding (HEVC) Defect Report 2," Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013, JCTVC-O1003_v2, Nov. 24, 2013, 311 pp.
Wiegand T., et al.,"Overview of the H.264/AVC Video Coding Standard," IEEE Transactions on Circuits and Systems for Video Technology, IEEE Service Center, Piscataway, NJ,US, vol. 13, No. 7, Jul. 1, 2003 (Jul. 1, 2003), pp. 560-576, XP011221093, ISSN:1051-8215, DOI:10.1109/TCSVT.2003.815165.
Second Written Opinion of International Application No. PCT/US2016/033553, dated Apr. 25, 2017, 9 pp.
International Preliminary Report on Patentability, Application No. PCT/US2016/033553, dated Aug. 17, 2017, 21 pp.

\* cited by examiner

SLICE LEVEL INTRA BLOCK COPY AND OTHER VIDEO CODING IMPROVEMENTS

This application claims the benefit of U.S. Provisional Patent Application No. 62/168,396 filed 29 May 2015, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC), standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques that may improve existing video coding techniques and, more specifically, may improve existing intra block copy (IBC)-related video coding techniques. The techniques of this disclosure may, in some coding scenarios, enable finer control of the use of IBC by, for example, enabling IBC on a slice level.

In one example, a method for decoding video data includes receiving a slice of the video data; parsing an intra block copy (IBC) syntax element to determine that an IBC mode is enabled for the slice; parsing a slice type syntax element associated with the slice to determine that the slice is an I slice; and decoding the slice as an I slice, wherein decoding the slice as an I slice comprises decoding all blocks of the slice using at least one intra prediction coding mode.

In another example, a device for decoding video data includes a memory configured to store the video data and one or more processors configured to receive a slice of the video data; parse an intra block copy (IBC) syntax element to determine that an IBC mode is enabled for the slice; parse a slice type syntax element associated with the slice to determine that the slice is an I slice; and decode the slice as an I slice, wherein to decode the slice as an I slice, the one or more processors are configured to decode all blocks of the slice using at least one intra prediction coding mode.

In another example, an apparatus for decoding video data, the apparatus comprising means for receiving a slice of the video data; means for parsing an intra block copy (IBC) syntax element to determine that an IBC mode is enabled for the slice; means for parsing a slice type syntax element associated with the slice to determine that the slice is an I slice; and means for decoding the slice as an I slice, wherein the means for decoding the slice as an I slice comprises means for decoding all blocks of the slice using at least one intra prediction coding mode.

In another example, a computer readable storage medium stores instructions that when executed by one or more processors cause the one or more processors to receive a slice of the video data; parse an intra block copy (IBC) syntax element to determine that an IBC mode is enabled for the slice; parse a slice type syntax element associated with the slice to determine that the slice is an I slice; and decode the slice as an I slice, wherein to decode the slice as an I slice, the one or more processors decode all blocks of the slice using at least one intra prediction coding mode.

The details of one or more examples of the disclosure are set forth in the accompanying drawings and the description below. Other features, objects, and advantages will be apparent from the description, drawings, and claims.

DETAILED DESCRIPTION

Figure 1:
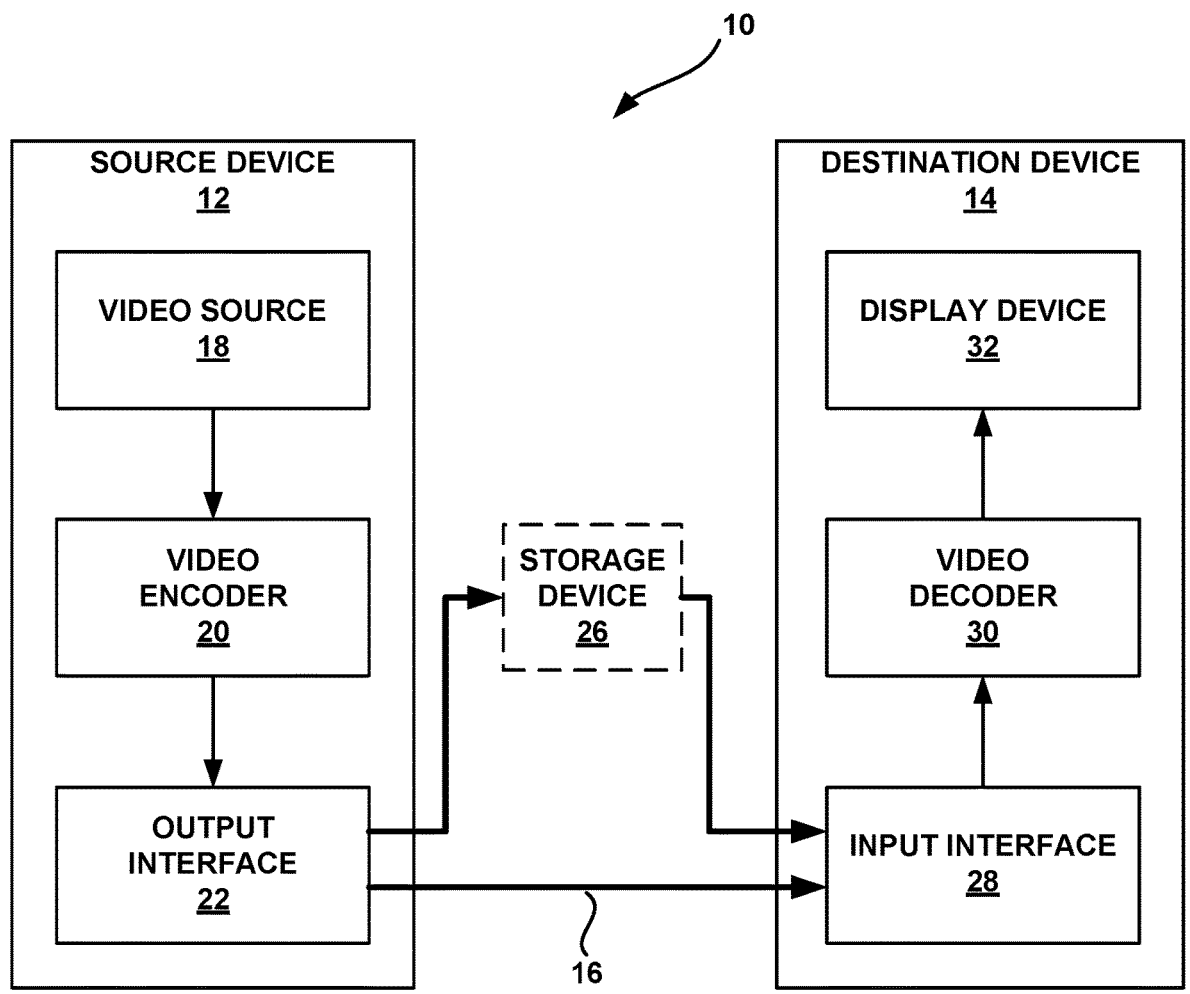
FIG. 1 is a block diagram illustrating an example video encoding and decoding system that may utilize the techniques described in this disclosure.

A video sequence is generally represented as a sequence of pictures. Typically, block-based coding techniques are used to code each of the individual pictures. That is, each picture is divided into blocks, and each of the blocks is individually coded. Coding a block of video data generally involves forming a predicted value for the block and coding a residual value that represents the difference between the original block and the predicted value. Specifically, the original block of video data includes a matrix of pixel values, and the predicted value includes a matrix of predicted pixel values. The residual value corresponds to pixel-by-pixel differences between the pixel values of the original block and the predicted pixel values, such that adding the residual values to the predicted values approximates the original values.

Prediction techniques for a block of video data are generally categorized as intra-prediction or inter-prediction. Intra-prediction, or spatial prediction, generally involves predicting the block from neighboring pixel values that are part of previously coded blocks in the same pictures as the block being predicted. Inter-prediction, or temporal prediction, generally involves predicting the block from pixel values of previously coded pictures (e.g., frames or slices).

Many applications, such as remote desktop, remote gaming, wireless displays, automotive infotainment, cloud computing, and others, are becoming routine in daily lives. Video content in these applications are usually combinations of natural content, text, artificial graphics, and other content. In text and artificial graphics regions, repeated patterns (such as characters, icons, symbols, or the like) often exist.

Intra prediction of blocks of video data from predictive blocks of video data within the same picture, which may be referred to as intra block copy (abbreviated IntraBC or IBC), and sometimes also referred to as intra motion compensation (IntraMC or IMC), is a technique which may enable a video coder to remove redundancy, and improve intra-frame coding efficiency. In typical intra prediction coding, video coders (e.g. video encoders and video decoders) use blocks of previously reconstructed video data that are either directly above or below or directly in line horizontally with the current block of video data in the same picture for prediction of the current video block. In other words, if a picture or frame of video data is imposed on a 2-D grid, each block of video data occupies a unique range of x-values and y-values. Accordingly, some video coders may predict a current block of video data based on blocks of previously coded video data in the same picture that share only the same set of x-values (i.e., vertically in-line with the current video block) or the same set of y-values (i.e., horizontally in-line with the current video block).

It may be advantageous for a video coder to predict a current video block from a previously reconstructed block of video data that is in the same frame or picture but is not necessarily directly above or to the left (or directly to the right or below) of the current block of video data. By including more video blocks in the predictive set, a video coder may achieve more accurate prediction of the current video block, thereby increasing coding efficiency.

In general, this disclosure describes techniques for coding video data that include a mode for intra prediction of blocks of video data from predictive blocks of video data within the same picture, which may be referred to as an IBC mode. The IBC techniques of this disclosure may include identifying a predictive block of video data for the current block of video data. The predictive block of video data may, for example, correspond to a reconstructed block of video data within the same picture as the current block of video data. The predictive block of video data may be from within an intended region that is within the picture. The intended region may also be referred to as an IBC prediction region. The intended region may, for example, correspond to a region above, above-right, above-left, and/or left of the current block of video data. The predictive block of video data is not limited to being either immediately above or immediately to the left of the current video block, and consequently, the vector used to identify the predictive block relative to the current block is not necessarily a one-dimensional vector. Instead, to identify or determine the predictive block of video data, a video coder may code one or more syntax elements that define a two-dimensional vector that includes a horizontal displacement component and a vertical displacement component relative to the current block of video data. The two-dimensional vector may be referred to as a block vector, offset vector, or motion vector and may, for example, be used to identify a predictive block relative to a top-left corner of the current block.

This disclosure describes techniques that may improve existing video coding techniques and, more specifically, may improve existing IBC-related video coding techniques. The techniques of this disclosure may, in some coding scenarios, enable finer control of the use of IBC by, for example, enabling IBC on a slice level. The proposed techniques may be used with any bit depth, chroma sampling format, and/or so on.

As used herein, the term "video coder" refers generically to both video encoders and video decoders. In this disclosure, the terms "video coding" or "coding" may refer generically to video encoding or video decoding. Thus, unless stated otherwise, it should be assumed that techniques described with reference to coding may be performed by either a video encoder or a video decoder. In some portions of this application, certain techniques may be described with reference to video decoding or to a video decoder. It should not be assumed, however, that such techniques are not applicable to video encoding or may be not be performed by a video encoder. Such techniques may, for example, be performed as part of determining how to encode video data or may be performed as part of a video decoding loop in a video encoder.

As used in this disclosure, the term current block refers to a block currently being coded, as opposed to a block that is already coded or yet to be coded. Similarly, a current coding unit, prediction unit, or transform unit, refers to a coding unit, prediction unit, or transform unit that is currently being coded.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Various extensions to HEVC, such as extensions for 3D, multiview, scalable, and screen content are presently under development. Additionally, the Range Extensions to HEVC, namely HEVC RExt, is also being developed by the JCT-VC. A recent Working Draft (WD) of Range extensions, referred to as RExt WD7 hereinafter, is available from http://phenix.int-evry.fr/jct/doc_end_user/documents/17_Valencia/wg11/JCTVC-Q1005-v4.zip.

In this disclosure, the HEVC specification text as in JCTVC-Q1003 is often referred to as HEVC version 1. Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC, including extensions of HEVC as well as next generation standards.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard, ITU-T H.265. HEVC enables several additional capabilities of video coding devices relative to existing devices according to, e.g., ITU-T H.264/AVC. For example, whereas H.264 provides nine intra-prediction encoding modes, HEVC supports as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Recently, investigation of new coding tools for screen-content material such as text and graphics with motion was requested, and technologies that improve the coding efficiency for screen content have been proposed. As there is evidence that in some coding scenarios improvements in coding efficiency may be obtained by exploiting the characteristics of screen content with novel dedicated coding tools, a Call for Proposals (CfP) was issued with the target of possibly developing future extensions of the High Efficiency Video Coding (HEVC) standard including specific tools for screen content coding (SCC). The use cases and requirements of this CfP are described in MPEG document N14174. During the $17^{th}$ JCT-VC meeting, the SCC test model (SCM) was established. A recent Working Draft (WD) of SCC is available from http://phenix.int-evry.fr/jct/doc_end_user/documents/20_Geneva/wg11/JCTVC-T1005-v2.zip.

In the current SCC, IBC signaling is unified with inter prediction signaling by adding the current picture to the reference picture list. Before decoding the current slice, video decoder 30 marks the current picture as a long-term reference picture. Then, the current picture is converted back to a short-term reference picture after the decoding of the current picture is complete. The signaling and coding methods, including merge/AMVP signaling, AMVP derivation and MVD coding, are the same as in the inter case, with a difference that the motion vectors for IBC mode are required to be integer motion vectors. The IBC block can be differentiated from the conventional inter blocks by checking the corresponding reference picture. If only the current picture is used as a reference picture, then the current block is an IBC block. Otherwise, the current block is an inter block. The SPS-level syntax element curr_pic_as_ref_enabled_flag may be used to indicate whether already coded portions of the current picture can be used as a reference picture for coding blocks of the current picture. In other words, video decoder 30 may receive the syntax element curr_pic_as_ref_enabled_flag, and in response to syntax element curr_pic_as_ref_enabled_flag being equal to 1, video decoder 30 may decode some blocks of slices associated with the SPS using IBC.

Figure 2:
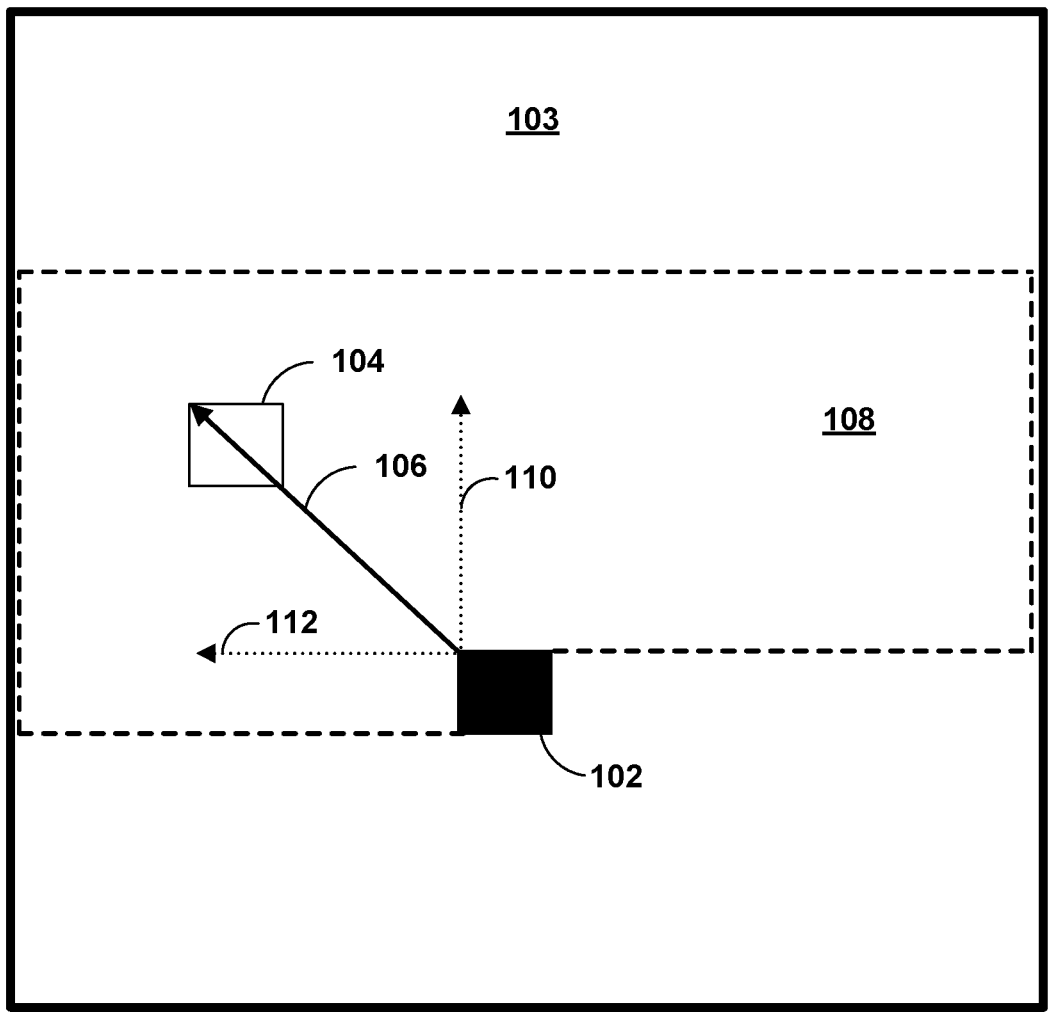
FIG. 2 is a conceptual diagram illustrating an example predictive block of video data within a current picture for predicting a current block of video data within the current picture according to the techniques of this disclosure.

FIG. 2 is a conceptual diagram illustrating an example technique for predicting a current block of video data 102 within a current picture 103 according to a mode for intra prediction of blocks of video data from predictive blocks of video data within the same picture according to this disclosure, e.g., according to an IBC mode in accordance with the techniques of this disclosure. FIG. 2 illustrates a predictive block video block 104 within current picture 103. A video coder, e.g., video encoder 20 and/or video decoder 30, may use predictive video block 104 to predict current video block 102 according to an IBC mode in accordance with the techniques of this disclosure.

Video encoder 20 selects predictive video block 104 for predicting current video block 102 from a set of previously reconstructed blocks of video data. Video encoder 20 reconstructs blocks of video data by inverse quantizing and inverse transforming the video data that is also included in the encoded video bitstream, and summing the resulting residual blocks with the predictive blocks used to predict the reconstructed blocks of video data. In the example of FIG. 2, intended region 108 within picture 103, which may also be referred to as an "intended area" or "raster area," includes the set of previously reconstructed video blocks. Video encoder 20 may define intended region 108 within picture 103 in variety of ways, as described in greater detail below. Video encoder 20 may select predictive video block 104 to predict current video block 102 from among the video blocks in intended region 108 based on an analysis of the relative efficiency and accuracy of predicting and coding current video block 102 based on various video blocks within intended region 108.

Video encoder 20 determines two-dimensional vector 106 representing the location or displacement of predictive video block 104 relative to current video block 102. Two-dimensional block vector 106 includes horizontal displacement component 112 and vertical displacement component 110, which respectively represent the horizontal and vertical displacement of predictive video block 104 relative to current video block 102. Video encoder 20 may include one or more syntax elements that identify or define two-dimensional block vector 106, e.g., that define horizontal displacement component 112 and vertical displacement component 110, in the encoded video bitstream. Video decoder 30 may decode the one or more syntax elements to determine two-dimensional block vector 106, and use the determined vector to identify predictive video block 104 for current video block 102.

In some examples, the spatial resolution of two-dimensional block vector 106 can be integer pixel resolution, e.g., be constrained to have integer pixel resolution. In such examples, the spatial resolution of horizontal displacement component 112 and vertical displacement component 110 may be integer pixel resolution. In such examples, video encoder 20 and video decoder 30 need not interpolate pixel values of predictive video block 104 to determine the predictor for current video block 102.

In other examples, the resolution of one or both of horizontal displacement component 112 and vertical displacement component 110 can be sub-pixel. For example, one of components 110 and 112 may have integer pixel resolution, while the other has sub-pixel resolution. In some examples, the resolution of both of horizontal displacement component 112 and vertical displacement component 110 can be sub-pixel, but horizontal displacement component 112 and vertical displacement component 110 may have different resolutions.

In some examples, a video coder, e.g., video encoder 20 and/or video decoder 30, adapts the resolution of horizontal displacement component 112 and vertical displacement component 110 based on a specific level, e.g., block-level, slice-level, or picture-level adaptation. For example, video encoder 20 may signal a flag at the slice level, e.g., in a slice header, that indicates whether the resolution of horizontal displacement component 112 and vertical displacement component 110 is integer pixel resolution or is not integer pixel resolution. If the flag indicates that the resolution of horizontal displacement component 112 and vertical displacement component 110 is not integer pixel resolution, video decoder 30 may infer that the resolution is sub-pixel resolution. In some examples, one or more syntax elements, which are not necessarily a flag, may be transmitted for each slice or other unit of video data to indicate the collective or individual resolutions of horizontal displacement components 112 and/or vertical displacement components 110.

In still other examples, instead of a flag or a syntax element, video encoder 20 may set based on, and video decoder 30 may infer the resolution of horizontal displacement component 112 and/or vertical displacement component 110 from resolution context information. Resolution context information may include, as examples, the color space (e.g., YUV, RGB, or the like), the specific color format (e.g., 4:4:4, 4:2:2, 4:2:0, or the like), the frame size, the frame rate, or the quantization parameter (QP) for the picture or sequence of pictures that include current video block 102. In at least some examples, a video coder may determine the resolution of horizontal displacement component 112 and/or vertical displacement component 110 based on information related to previously coded frames or pictures. In this manner, the resolution of horizontal displacement component 112 and the resolution for vertical displacement component 110 may be pre-defined or signaled, may be inferred from other, side information (e.g., resolution context information), or may be based on already coded frames.

Current video block 102 may be a CU, or a PU of a CU. In some examples, a video coder, e.g., video encoder 20 and/or video decoder 30, may split a CU that is predicted according to IBC into a number of PUs. In such examples, the video coder may determine a respective (e.g., different) two-dimensional vector 106 for each of the PUs of the CU. For example, a video coder may split a 2N×2N CU into two 2N×N PUs, two N×2N PUs, or four N×N PUs. As other examples, a video coder may split a 2N×2N CU into ((N/2)×N+(3N/2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder may predict a 2N×2N CU using a 2N×2N PU.

Current video block 102 may be a luma video block, or a chroma video block corresponding to a luma video block. In some examples, video encoder 20 may only encode one or more syntax elements defining two-dimensional vectors 106 for luma video blocks into the encoded video bitstream. In such examples, video decoder 30 may derive two-dimensional vectors 106 for each of one or more chroma blocks corresponding to a luma block based on the two-dimensional vector signaled for the luma block.

Depending on the color format, e.g., color sampling format or chroma sampling format, a video coder may downsample corresponding chroma video blocks relative to the luma video block. Color format 4:4:4 does not include downsampling, meaning that the chroma blocks include the same number of samples in the horizontal and vertical directions as the luma block. Color format 4:2:2 means that chroma is downsampled in the horizontal direction, such that there are half as many samples in the horizontal direction in the chroma blocks relative to the luma block. Color format 4:2:0 means that chroma is downsampled in the horizontal and vertical directions, such that there are half as many samples in the horizontal and vertical directions in the chroma blocks relative to the luma block.

In examples in which video coders determine vectors 106 for chroma video blocks based on vectors 106 for corresponding luma blocks, the video coders may need to modify the luma vector. For example, if a luma vector 106 has integer resolution with horizontal displacement component 112 and/or vertical displacement component 110 being an odd number of pixels, and the color format is 4:2:2 or 4:2:0, the converted luma vector may not point an integer pixel location in the corresponding chroma block. In such examples, video coders may scale the luma vector for use as a chroma vector to predict a corresponding chroma block. In some examples, video encoder 20 may define intended region 108, or scale the converted vector, such that a converted luma vector 106 used for predicting a chroma block may not point to predictive chroma blocks that are not reconstructed, or that are in-loop filtered. In this disclosure, if scaling of the vector for the chroma block is not explicitly mentioned, it should not be assumed that such scaling does not occur. Scaling of the vector for the chroma block may occur (but may not be necessary in every case) even if not explicitly described in the examples described in this disclosure.

This disclosure describes techniques for enabling I-slices for IBC. In the current draft text specification of the SCC extension to HEVC, I-slices cannot be used when IBC is enabled (e.g. when the syntax element curr_pic_as_ref_enabled_flag is equal to 1). Specifically, when curr_pic_as_ref_enabled_flag is equal to 1, the value of the slice_type syntax element cannot be equal to 2, with slice_type values of 0, 1, and 2 corresponding to B, P, and I slices, respectively. This provides some potential drawbacks. For example, conventionally intra coded slices (coded without using any picture, including the current picture, for reference) cannot be signaled through the slice_type syntax element, which may be useful in some scenarios, for example, to save some signaling overhead as described below.

This disclosure describes techniques for enabling I-slice usage even when IBC is enabled. Enabling I slice usage when IBC is enabled may, in some examples, allow the value of the slice_type syntax element to be equal to 2 (indicating that the coding type of a given slice is an I slice) even when curr_pic_as_ref_enabled_flag is equal to 1 (indicating IBC is enabled). In such a case, I-slices are conventionally intra coded slices that are coded without using any picture, including the current picture, for reference, and coded using normal intra prediction modes for all the coded blocks. In other words, no blocks of the conventional I slice are coded using inter prediction or IBC, and the only coding mode used for the conventional I slice is intra mode.

Video encoder 20 may, for example, be configured to implement such functionality by being configured to encode a slice of video data as an I slice and generate an IBC syntax element (e.g. curr_pic_as_ref_enabled_flag) with a value to indicate that an IBC mode is enabled for the slice. Video encoder 20 may additionally generate a slice type syntax element (e.g. slice_type) and set that syntax element to a value indicating a slice is an I slice. Video encoder 20 may, for example, include the IBC syntax element in an SPS and/or include the slice type syntax element in a slice header.

Video decoder 30 may, for example, be configured to implement such functionality by being configured to receive a slice of video data and parse an IBC syntax element (e.g. curr_pic_as_ref_enabled_flag) to determine that an IBC mode is enabled for the slice. For example, if video decoder 30 determines that the value of curr_pic_as_ref_enabled_flag is equal to 1, then video decoder 30 may determine that the IBC mode is enabled, whereas if curr_pic_as_ref_enabled_flag is equal to 0, video decoder 30 may determine the IBC mode is disabled. Video decoder 30 may also parse a slice type syntax element associated with the slice to determine the slice is an I slice and is to be decoded as an I slice. To decode the slice as an I slice, video decoder 30 may decode blocks of the slice using only intra prediction and without using an inter prediction mode and without using an IBC mode.

Alternatively, this disclosure proposes introducing another slice type. For example, an IBC-slice may be used to indicate the usage of IBC mode without having any other reference pictures except the current picture. In other words, for an IBC slice, a video coder may code blocks of the IBC slice using intra mode or IBC mode, but not using inter mode. In such an example, the value of the syntax element slice_type can be equal to 0, 1, 2 or 3, with the newly allowed value of 3 specifying an IBC slice. As shown in TABLE 1 below, the semantics of other values may remain unchanged. When slice_type is set to IBC slice, some signaling for inter modes for P and B slices may be avoided. For example, if video decoder 30 determines that a slice is an IBC slice, information such as the cu_skip_flag syntax element, the pred_mode_flag syntax element in the CU header, reference picture management information in the slice header, and other such information does not need to be included in a bitstream of encoded video data.

TABLE 1

| slice_type | Name of slice_type |
|---|---|
| 0 | B (B slice) |
| 1 | P (P slice) |
| 2 | I (I slice) |
| 3 | IBC (IBC slice) |

In accordance with the technique introduced above, video decoder 30 may be configured to receive a slice of video data and parse a slice type syntax element associated with the slice of the video data. In response to the slice type syntax element having a value indicating the slice is an IBC slice (e.g. slice_type equal to 3), then video decoder 30 may decode the slice as an IBC slice, which may include decoding some blocks of the slice using an IBC mode and/or decoding some blocks of the slice using intra mode. Video decoder 30 may decode other slices as I slices (e.g. slice_type equal to 2), P slices (slice_type equal 1), or B slices (slice_type equal to 0). Decoding the other types of slices may involve receiving some different syntax elements that are not received for slices decoded as IBC slices, and likewise, decoding the IBC slice may involve receiving some different syntax elements that are not received for the other slices.

This disclosure also describes techniques for a slice level IBC control flag. With existing techniques, whether IBC is enabled is solely controlled by (i.e., enablement of IBC is determined based on) the SPS flag, curr_pic_as_ref_enabled_flag. Allowing a finer control of IBC, at the slice level for instance, may have several potential benefits. As one example, slice level IBC control may specify whether blocks within the current slice may use the current picture as a reference. The IBC mode may require additional storage of samples before in-loop filtering. When IBC is disabled at the slice level, a smart decoder may avoid storing these additional samples thereby reducing the average bandwidth and the average power usage. As another example, slice level IBC control allows for slices not using IBC to have more reference indices allocated to the temporal reference pictures, which allows for more weights to be signaled in weighted prediction for potentially improved coding efficiency in certain scenarios.

Techniques for enabling slice-level IBC control will now be described in more detail. Video encoder 20 may signal a slice level IBC control flag, for example, slice_curr_pic_as_ref_enabled_flag, in a slice header when IBC is enabled (e.g. curr_pic_as_ref_enabled_flag is equal to 1). Additionally, video decoder 30 can infer (i.e., determine without the receipt of explicit signaling) the value of slice_curr_pic_as_ref_enabled_flag to be equal to 0 if not signaled. The slice level control flag may be signaled only for P slices and B slices and inferred to have a value of 0 for I slices. This slice level IBC flag may, for example, indicate whether the current picture is used as a reference picture for predicting blocks of the slice. In other implementations, the slice level IBC flag may indicate whether the current picture is added into a reference picture list for the current picture for self-reference, in which case the current picture is available for use as a reference picture for predicting blocks of the slice but, for some slices, may not actually be used for prediction. Additionally, if the slice_curr_pic_as_ref_enabled_flag is disabled (i.e., the value is either explicitly signaled to be equal to 0 or is inferred to be equal to 0, then video decoder 30 does not use the IBC mode for that particular slice, and the I-slice type signaling (as described above with respect to enabling I-slices for IBC) can be enabled.

The semantics for the slice_curr_pic_as_ref_enabled_flag syntax element may be as follows:

slice_curr_pic_as_ref_enabled_flag equal to 1 specifies that the current picture may be included in a reference picture list of the current picture when decoding the current slice. slice_curr_pic_as_ref_enabled_flag equal to 0 specifies that the current picture is never included in the reference picture list of the current picture when decoding the current slice. When not present, the value of slice_curr_pic_as_ref_enabled_flag is inferred to be equal to 0.

In general, the slice_curr_pic_as_ref_enabled_flag can replace the curr_pic_as_ref_enabled_flag in the slice header syntax after slice_curr_pic_as_ref_enabled_flag, in the syntax structures below the slice header level, the semantics, and the decoding process, for example, in the reference picture list construction, DPB management and etc. The syntax element curr_pic_as_ref_enabled_flag can be treated as a gating flag for slice_curr_pic_as_ref_enabled_flag signaling. For example, the value of NumPicTotalCurr may be derived based on the slice level control flag slice_curr_pic_as_ref_enabled_flag.

Additionally, the following condition may apply (when the techniques for enabling I-slices as described above are not applied):

When the current picture is a BLA or CRA picture, the value of NumPicTotalCurr shall be equal to slice_curr_pic_ref_enabled_flag.

In another alternative, video decoder 30 may be configured to derive a value of slice_curr_pic_as_ref_enabled_flag without explicit signaling. As part of the derivation, video decoder 30 may check the reference picture lists RefPicList0 and RefPicList1 up to the maximum number of reference pictures signaled in the slice header (e.g. num_ref_idx_l0_active_minus1 and num_ref_idx_l1_active_minus1 for RefPicList0 and RefPicList1 respectively), and if no reference picture is equal to the current picture, video decoder 30 may derive slice_curr_pic_as_ref_enabled_flag to be 0. Otherwise, video decoder 30 may derive slice_curr_pic_as_ref_enabled_flag to be equal to 1. The derived flag may, for example, be used instead of the signaled slice level IBC flag in the decoding process and other related usages.

To implement the slice level IBC control flag described above, video decoder 30 may be configured to receive a slice of video data and parse a slice-level syntax element (e.g. slice_curr_pic_as_ref_enabled_flag) to determine that an IBC mode is enabled for the slice. Video decoder 30 may be configured to construct a reference picture list for the slice of the video data, and a number of pictures included in the reference picture list may be dependent on whether the slice-level syntax element indicates IBC is enabled or disabled. Video decoder 30 may parse the slice-level syntax element to determine that the IBC mode is enabled for the slice is performed in response to determining the slice is one of a P slice or a B slice. For slices that are determined to be I slices, video decoder 30 may infer a value of the slice-level syntax element to indicate that IBC mode is disabled. Video decoder 30 may construct a reference picture list for the slice of the video data, and in response to the slice-level syntax element indicating the IBC mode is enabled, add the picture containing the slice to the reference picture list.

This disclosure also describes potential constraints on the use of a slice level IBC control flag and slice_type. Any of the constraints or aspects introduced below can be applied independently or in combination with one or more of the other constraints in this section or other sections in this disclosure.

In some examples, bitstream conformance may have the following requirements:

The value of slice_curr_pic_as_ref_enabled_flag shall not be equal to 0 for P and B slices when only currPic is available for reference.

The value of slice_curr_pic_as_ref_enabled_flag shall not be equal to 0 for P and B slices when nal_unit_type has a value in the range of BLA_W_LP to RSV_TRAP_VCL23, inclusive (i.e. the picture is an TRAP picture). RefPicList0 shall contain one or more entries that refer to only the current picture.

Alternatively, slice_curr_pic_as_ref_enabled_flag shall not be signaled for P and B slices when only currPic is available for reference (i.e., when the DPB contains only one reference picture that is the current picture) and the value is inferred to be Changes to the decoding process will now be discussed. The decoding process may be changed as shown with the underlined text. The changes shown may be applied separately or jointly.

When atleastonesliceinthecurrentpicturehas slice_curr_pic_as_ref_enabled_flag equal to 1, a picture storage buffer in the DPB is allocated for the current picture, and the current picture is marked as "used for long-term reference."

The processes in clauses 8.4, 8.5, 8.6, and 8.7 specify decoding processes using syntax elements in all the syntax structure layers. It is a requirement of the bitstream conformance that the coded slices of the picture shall contain slice segment data for every coding tree unit of the picture, such that the division of the picture into slices, the division of the slices into slice segments and the division of the slice segments into coding tree units each forms a partitioning of the picture.

Whenatleastonesliceincurrentpicturehasslice_curr_pic_as_ref_enabled_flag is equal to 1, the decoded sample values of the current picture before in-loop filtering are stored into the picture storage buffer allocated for the current picture.

NOTE 2—When atleastonesliceincurrentpicturehasslice_curr_pic_as_ref_enabled_flag is equal to 1, one additional picture storage buffer, not counted as part of the DPB, is needed for storage of the sample values of the current picture after in-loop filtering.

This disclosure also describes a collocated picture constraint. In the current WD, there is a constraint that the current picture cannot be used as a collocated picture. The reason for this constraint is that there would be no motion field yet assigned for the collocated block to be used in the motion prediction if the collocated picture were the current picture.

This constraint can be removed, for example, by initializing the motion field of the current picture prior to processing of the current picture. For example, the current picture can be initialized having all blocks as intra coded, meaning there is no motion field information. Alternatively, the motion field can be initialized with the default motion field, where the default motion field is known for both encoder and decoder, for example zero motion (zero motion vectors with zero reference indices) in at least one inter direction associated with RefPicList0 or RefPicList1, or both. Additionally, the default motion field assigned to a slice can be dependent on the slice type. For example, for an I-slice all blocks in that slice are initialized with intra mode, for a P-slice, RefPicList0 related motion field is set to zero motion, for B-slice zero motion is assigned in both directions associated with RefPicList0 and RefPicList1.

In addition, the above-mentioned constraint (that the current picture cannot be used as a collocated picture) is specified in a form of encoder constraint or bitstream constraint, which may be violated by some encoders, making the bitstream potentially broken.

This disclosure describes techniques for making this constraint stricter by, for example, modifying the syntax such that the values of the syntax elements not satisfying the constraint cannot be signaled in the bitstream.

First, the TMVP enable flag signaled in the slice header has to be disabled if the slice has only the current picture as a reference picture(s), since the current picture cannot be used as a collocated picture. There can be more than one reference pictures, where all of them can be the current picture.

Alternatively, the TMVP enable flag signaling can be moved and placed after the signaling of the number of reference pictures used in a slice (e.g. num_ref_idx_l0_active_minus1 and num_ref_idx_l1_active_minus1), and a check can be performed to determine whether all the reference pictures are the current picture. If all the reference pictures are the current picture, the TMVP enable flag is not signaled and is derived to be disabled (i.e., equal to 0).

In another alternative, instead of deriving whether all the reference pictures are the current picture, a flag can be signaled in the slice header to indicate such a case.

Additionally, for signaling of the collocated_ref_idx, the reference indices pointing to the current picture can be excluded from being referenced by collocated_ref_idx, and the value of the collocated_ref_idx is reduced by the number of reference indices that point to the current reference picture present before the desired collocated picture. In a similar way, after parsing, the parsed collocated_ref_idx is increased by the number of reference indices pointing to the current reference picture prior to the signaled collocated_ref_idx.

According to one example, assume RefPicList={Pic0, Curr, Pic1, Curr, Pic2}.

To make Pic0 as a collocated picture, collocated_ref_idx=0 is signaled.

To make Pic1 as a collocated picture, collocated_ref_idx=1 is signaled, and collocated_ref_idx is incremented by 1 making collocated_ref_idx equal to 2.

To make Pic2 as a collocated picture, collocated_ref_idx=2 is signaled, and collocated_ref_idx is incremented by 2 making collocated_ref_idx equal to 4.

For example, the encoding part can be implemented as the following pseudo-code, assuming that the desired collocated_ref_idx is equal to N.

```
collocated_ref_idx = N;
for( i = 0; i < N; i++ )
{
  if( RefPicList[i] is the current picture )
    collocated_ref_idx--;
}
```

For example, the decoding part can be implemented as the following pseudo-code, where collocated_ref_idx is the parsed value to be updated.

```
for( i = 0; i <= collocated_ref_idx; i++ )
{
  if( RefPicList[i] is the current picture )
    collocated_ref_idx++;
}
```

In the provided example, collocated_ref_idx cannot be equal to the current picture (Curr) because the value of the collocated_ref_idx will be incremented by the decoder, thus making it impossible for the current picture to be a collocated picture.

Additionally, the conditions under which the collocated_ref_idx is signaled can be modified to exclude the cases when collocated_ref_idx can have only one value. In this case, the number of reference pictures included into RefPicList0 and RefPiclList1 can be counted (denoted herein as numCurrRef0 and numCurrRef1), and the number of reference pictures (e.g. num_ref_idx_l0_active_minus1 and num_ref_idx_l1_active_minus1) can be reduced by the number of reference indices equal to the current picture for RefPicList0 and RefPicList1. This modified number of reference indices can be used instead of the signaled number of reference indices in the slice header in the decoding process, for example in signaling the collocated_ref_idx.

For example, the implementation can be accomplished as follows.

```
numCurrRef0 = 0;
for( i = 0; i <= num_ref_idx_l0_active_minus1; i++ )
{
  if( RefPicList0[i] is the current picture )
    numCurrRef0++;
}
numCurrRef1 = 0;
for( i = 0; i <= num_ref_idx_l1_active_minus1; i++ )
{
  if( RefPicList1[i] is the current picture)
    numCurrRef1++;
}
```

The collocated reference index is signaled only when the number of possible collocated indices is more than 1, e.g.

```
if( slice_temporal_mvp_enabled_flag ) {
  if( slice_type == B )
    collocated_from_l0_flag                              u(1)
  if( ( collocated_from_l0_flag &&
(num_ref_idx_l0_active_minus1 –
numCurrRef0) > 0 ) || ( !collocated_from_l0_flag &&
( num_ref_idx_l1_active_minus1 –
numCurrRef1) > 0 ) )
    collocated_ref_idx                                   ue(v)
}
```

The underlined parts in are added on top the current draft text specification.

Example: RefPicList0={Curr, Pic0, Curr} num_ref_idx_l0_active_minus1 is signaled equal to 2, and numCurrRef0 is equal to 2 (since there are 2 current reference pictures in the reference picture list).

num_ref_idx_l0_active_minus1−numCurrRef0 is equal to 0, and collocated_ref_idx is not signaled, but inferred equal to 0, however the real value is 1 (zero index points to current picture).

After inference to 0, the collocated index modification described above is used

```
for( int i = 0; i <= collocated_ref_idx; i++ )
{
 if( RefPicList0[i] is the current picture )
   collocated_ref_idx++;
}
``` which will produce the collocated_ref_idx equal to 1, since one increment will happen due the first reference picture being equal to current picture in the reference picture list.

In this example, collocated_ref_idx signaling is saved compared with the current draft text specification, where collocated_ref_idx is signaled but is required to be equal to 1. Any technique described herein related to the collocated picture constraints and collocated reference index signaling may be used independently or in any combination.

This disclosure also describes techniques for disabling list modification based on a number of active reference pictures. In the current WD, the ref_pic_list_modification process may be invoked when NumPicTotalCurr>1 and lists_modification_present_flag=1. This disclosure proposes that when num_ref_idx_l0_active_minus1=0 (that is the maximum reference index for reference picture list 0 that may be used to decode the slice is equal to 0) and the slice level IBC control flag described above with respect to slice level IBC control flags is equal to 1, the list modification information is redundant and can be inferred. In other words, in some implementations, the current picture may always be added to the reference picture list when IBC mode is enabled without requiring the list modification process.

This disclosure describes techniques for not signaling list modification information when num_ref_idx_l0_active_minus1=0 and slice_curr_pic_as_ref_enabled_flag=1. The list modification process may be inferred to include curPic as the first entry in the RefPicList0. In other words, in some implementations, the current picture may always be added to the reference picture list when IBC mode is enabled without requiring the list modification process.

For example, if video encoder 20 determines that IBC is enabled for an IBC slice, then the only reference picture in a reference picture list for the slice is the current picture that includes that slice. Thus, in response to determining that a number of reference pictures in a reference picture list for the slice of the video data is equal to one and in response to the IBC mode being enabled for the slice, video encoder 20 may be configured to disable reference picture list modification and not include reference picture list modification information for the slice in an encoded bitstream. Similarly, video decoder 30 may be configured to receive a syntax element (e.g. num_ref_idx_l0_active_minus1) indicating a number of reference pictures in a reference picture list for the slice of the video data and, in response to the syntax element indicating the number of reference pictures in the reference picture list for the slice of the video data is equal to one (e.g. num_ref_idx_l0_active_minus1 equal to 0) and in response to that the IBC mode being enabled for the slice (e.g. slice_curr_pic_as_ref_enabled_flag=1 and/or curr_pic_as_ref_enabled_flag=1), video decoder 30 may disable reference picture list modification. Video decoder 30 may, for example, disable reference picture list modification by constructing the reference picture list without receiving reference picture list modification information. In one example, disabling reference picture list modification may mean that information (e.g., syntax elements) associated with reference picture list modification information is not signaled in a bitstream, thus potentially improving compression and reducing decoder-side complexity.

Although the above examples have been described with respect to RefPicList0, it should be appreciated that the above techniques are equally applicable to RefPicList1 as well.

| slice_segment_header( ) { | Descriptor |
|---|---|
| first_slice_segment_in_pic_flag | u(1) |
| ...... | |
|   if(curr_pic_as_ref_enabled_flag && | |
|   (slice_type = = P \|\| slice_type = = B)) | |
|     slice_curr_pic_as_ref_enabled_flag | |
| ....... | |
|   if( lists_modification_present_flag && | |
| NumPicTotalCurr > 1 <u>&&</u> | |
| <u>!(slice_curr_pic_as_ref_enabled_flag &&</u> | |
| <u>num_ref_idx_l0_active_minus1 == 0))</u> | |
|     ref_pic_lists_modification( ) | |
|   .... | |
|   byte_alignment( ) | |
| } | |

In a first example implementation, the list modification may not be signaled when num_ref_idx_l0_active_minus1=0 (that is, the maximum reference index for reference picture list 0 that may be used to decode the slice is equal to 1) and SPS level IBC control flag as in current draft specification (curr_pic_as_ref_enabled_flag) is equal 1. The list modification process is inferred to include curPic as the first entry in the RefPicList0.

The above may extend to RefPicList1 as well.

| slice_segment_header( ) { | Descriptor |
|---|---|
| first_slice_segment_in_pic_flag | u(1) |
| ...... | |
|   if(curr_pic_as_ref_enabled_flag && | |
|   (slice_type = = P \|\| slice_type = = B)) | |
|     slice_curr_pic_as_ref_enabled_flag | |
| ....... | |
|   if( lists_modification_present_flag && | |
| NumPicTotalCurr > 1 <u>&& && !</u> | |
| <u>(curr_pic_as_ref_enabled_flag &&</u> | |
| <u>num_ref_idx_l0_active_minus1 == 0))</u> | |
|     ref_pic_lists_modification( ) | |
|   .... | |
|   byte_alignment( ) | |
| } | |

This disclosure also describes techniques for implementing in-loop filtering as post processing. In other words, filters that are applied as in-loop filters in some coding scenarios may be applied as post-loop filters in other coding scenarios. When the IBC mode is used, the reference samples of the current picture used for IBC prediction are not filtered. In other words, in-loop filters such as deblocking filter and SAO may not be applied to IBC reference samples. In-loop filtering, however, may still be applied to the reconstructed samples for regular prediction. These techniques may improve overall coding efficiency and device performance for multiple reasons. As one example, filtering may not be a good predictor for graphical content, and thus the computational complexity associated with filtering may provide minimal or no benefit for certain types of video content. As another example, due to a need to store unfiltered and filtered samples for the current picture (for IBC and regular inter modes), in-loop filtering may increase bandwidth for writing and reading the samples and increase required storage capacity.

In one example, video decoder 30 may apply in-loop filters only when the picture is output or displayed and use the unfiltered pixels associated with the reference pictures for both IBC and regular inter modes. For such an example, video decoder 30 may be configured to reconstruct a block of video data using an IBC mode and output a picture that includes the block, with the block in the outputted picture being filtered using one or more loop filters. Video decoder 30 may, however, store, as a reference picture for future blocks, a picture with an unfiltered version of the block.

This may reduce the bandwidth since only unfiltered pixels are required to be stored and may make prediction for graphical content better by preserving the details which may be removed by a filter. However, in-loop filters may still be applied to pictures that are output for display.

An IBC control flag or a new flag can be used to derive whether in-loop filters should be used as post filters or filters applied to the output picture. For example, video decoder 30 may be configured to receive a syntax element indicating if a loop filter operation is to be applied in-loop or post-loop in response to determining that an IBC mode is enabled. Additionally, a new flag can be signaled when an IBC mode is in use. Such a flag may, for example, be derived to be equal to 0 when not present in a bitstream.

In another example, IBC mode can use filtered samples (e.g., deblock filtered, SAO filtered, or ALF filtered) when filtered images are available. For the filter, some pixels outside of the block being filtered may be needed but unavailable. When such outside pixels are available, i.e. already reconstructed, then the filtered pixels may be used for prediction in IBC mode. If at least one pixel needed for filtering is not available, unfiltered samples are used for IBC prediction. In this case, the bandwidth may be reduced since the amount of unfiltered pixels to be stored for IBC prediction is reduced. Alternatively, IBC can reference only filtered samples; in this case, unfiltered samples (for example, samples that require at least one pixel which is not yet reconstructed) may not be needed to be stored for IBC prediction. This restriction can be accomplished, for example, by an encoder or bitstream constraint that an MV used to derive a prediction block shall not include such samples.

In the above example, a check for filtered or unfiltered pixels to be used with IBC prediction may be complex, since a neighbor CU can be used for prediction. To simplify the derivation process, unfiltered samples of the current CTU containing the current block can be used for IBC prediction, and the filtered samples located outside of the current CTU, if available, are used for IBC prediction. In this case, bandwidth associated with the storing of unfiltered pixels may be reduced, since the current CTU samples can be stored in the cache and not need to be stored in the external memory of encoder 20 or decoder 30.

A flag can be introduced to indicate whether the selection between filtered or unfiltered samples for IBC prediction is applied. This flag can be signaled when IBC mode is used and derived to be disabled if not present in a bitstream.

Alternatively, signaling to indicate the selection between filtered or unfiltered samples for IBC prediction could be in terms of delay (in units of CTU, slices, tiles). For example, IBC prediction from the blocks prior to the delay value may only use filtered samples and after the delay value may use unfiltered samples. Described aspects in the above examples can be used independently or in any combination with other described methods.

This disclosure describes techniques that may result in bandwidth reduction. For existing implementations of IBC mode, a video decoder does not filter prediction samples; So, if IBC is enabled, in addition to the filtered samples, extra unfiltered samples also need to be stored, resulting in the at least the storing bandwidth being doubled if IBC mode is used.

According to techniques of this disclosure, in order to reduce the bandwidth increase caused by the unfiltered samples, instead of storing the unfiltered samples, video decoder 30 may store the difference between filtered samples and unfiltered samples. As filter operations (e.g., deblock, SAO) only cause small value changes, the difference between filtered samples and unfiltered samples may not need the full bit-depth for storage, which may help to reduce the storing bandwidth required to store both filtered an unfiltered samples for use with IBC mode. Furthermore, some compression schemes, which in one example can be lossless compression, like prediction from neighbors and variable length coding can be applied to further reduce the bandwidth and storage space. In such an implementation, video decoder 30 may be configured to perform a loop filtering operation on a reconstructed block of video data to generate a filtered reconstructed block, store difference values indicating a difference between the filtered reconstructed block and the reconstructed block, and predict a block based at least in part on the stored difference values.

This disclosure also describes techniques for applying filtering to prediction samples. As mentioned in the above section, in the current design for the IBC mode, the prediction samples are unfiltered reconstructed samples of the current picture (pre-SAO or de-blocking). These unfiltered samples need to be stored in addition to the filtered samples that are sent to display. In this section, some methods are proposed to avoid the need for additional storage of unfiltered samples.

According to a first technique of this disclosure, a video coder (e.g., video encoder 20 or video decoder 30) may apply SAO and de-blocking to the prediction samples instead of reconstructed samples. An example implementation is provided below. The example implementation compares the current design with one example of a design proposed in this disclosure.

Current design: Final Recon=Filtered (Pred+Residue)
Proposed design: Final Recon=Filtered (Pred)+Residue.
where,
Filtered: represents either or both processes, SAO and de-blocking
Pred: represents unfiltered prediction samples.

With respect to the first technique described above, a video coder may apply SAO and deblocking to the prediction samples of any mode (e.g., Inter, IBC, intra). According to a second technique, a video coder may apply the techniques described above for applying SAO and de-blocking to prediction samples of the IBC mode. This technique may be applied in addition to the techniques described in JCTVC-T0045. In T0045, filtering is disabled for CTUs that can be used for IBC as reference. This may introduce objective and subjective quality degradation. Accordingly, this disclosure introduces techniques for applying filtering to prediction samples for the IBC mode only.

An example implementation will now be described. This disclosure describes techniques for applying SAO and de-blocking to the prediction samples instead of reconstructed samples for IBC mode. Further, a flag may be signaled in the bitstream if a CTU is to be used as a reference area for IBC, in which case the flag switches off the in-loop post-processing (deblocking and SAO) for that CTU, thus avoiding the additional storage.

Current design:
Final Recon=Filtered (Pred+Residue)
Proposed design:
Final Recon for IBC mode=Filtered (Pred)+Residue.
Final Recon for non IBC mode=Filtered (Pred+Residue)
where,
Filtered: represents either or both processes, SAO and de-blocking
Pred: represents unfiltered prediction samples.

As part of applying filtering to prediction samples as described above, video decoder 30 may be configured to determine a prediction block for a block of video data, filter the prediction block to generate a filtered prediction block, and add residual data to the filtered prediction block to generate a reconstructed block. To filter the prediction block, video decoder 30 may perform one or more of SAO filtering, deblock filtering, or ALF filtering. Video decoder 30 may filter the prediction block to generate the filtered prediction block in response to the block of video data being coded using an IBC mode. For a second block of video data coded in a coding mode other than IBC mode, video decoder 30 may add residual data to a second prediction block for the second block to generate a second reconstructed block and filter the second reconstructed block.

Figure 3:
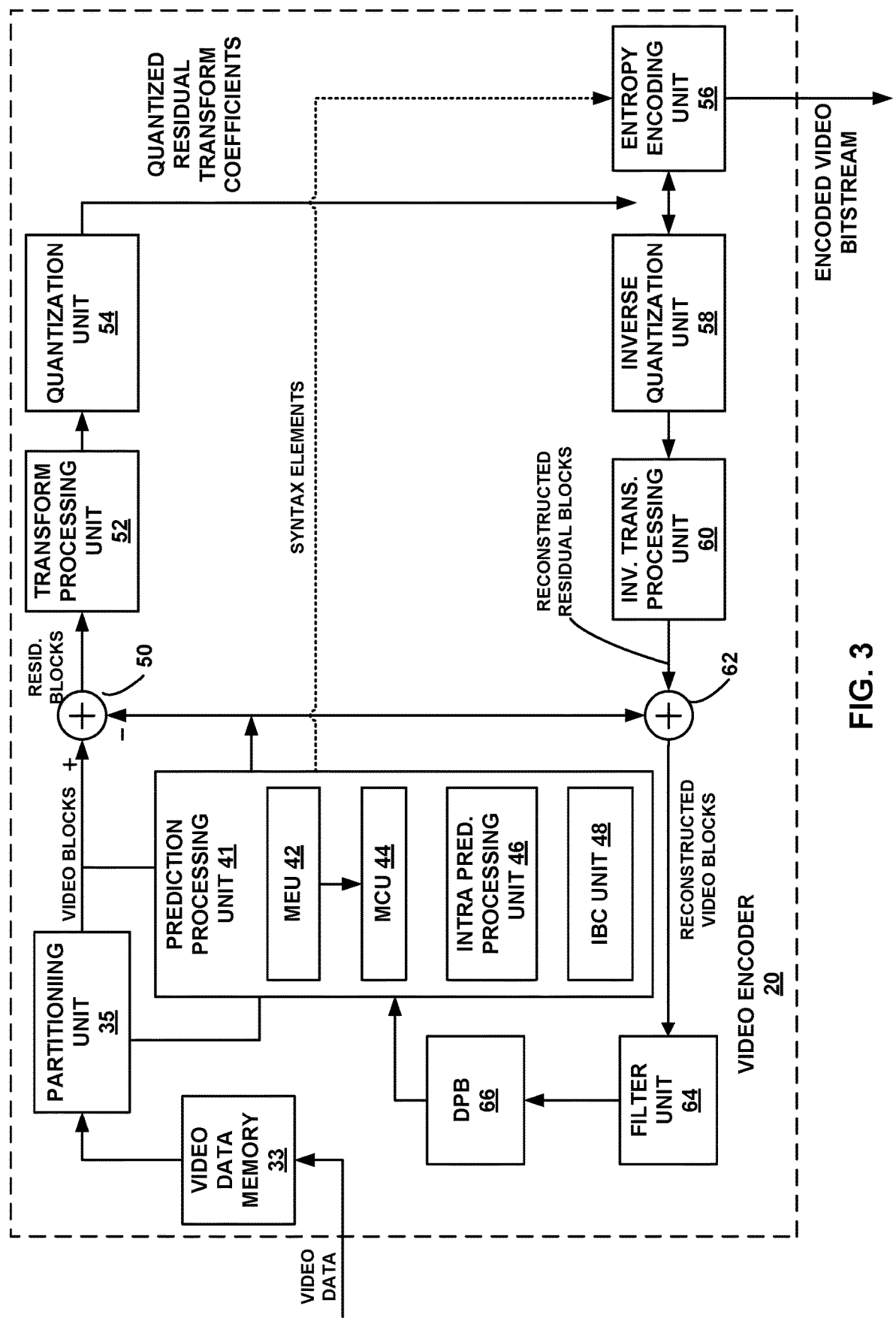
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, intra prediction processing unit 46, and IBC unit 48. Although shown separately in FIG. 3 for ease of explanation, it should be understood that MEU 42, MCU 44, intra prediction processing unit 46, and IBC unit 48 may in fact be highly integrated. For video block reconstruction, video encoder 20 also includes inverse quantization unit 58, inverse transform processing unit 60, summer 62, filter unit 64, and decoded picture buffer (DPB) 66.

As shown in FIG. 3, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and, in conjunction with prediction processing unit 41, partitions the video data into video blocks. This partitioning may also include partitioning into slices, tiles, or other larger units, as wells as video block partitioning, e.g., according to a quadtree structure of LCUs and CUs. Although shown separately for purposes of example, partitioning unit 35 and prediction processing unit 41 may be highly integrated, and both partitioning unit 35 and prediction processing unit 41 may perform aspects of the process of determining how to partition a picture of video. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

In some examples, IBC unit 48 may generate two-dimensional vectors and fetch predictive blocks in a manner similar to that described above with respect to motion estimation unit 42 and motion compensation unit 44, but with the predictive blocks being in the same picture or frame as the current block. In other examples, IBC unit 48 may use motion estimation unit 42 and motion compensation unit 44, in whole or in part, to perform such functions for IBC prediction according to the techniques described herein. In either case, for IBC, a predictive block may be a block that is found to closely match the block to be coded, in terms of pixel difference, which may be determined by SAD, SSD, or other difference metrics, and identification of the block may include calculation of values for sub-integer pixel positions.

After prediction processing unit 41 generates the predictive block for the current video block, via intra prediction, inter prediction, or IBC, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may apply one or more of deblocking filtering, sample adaptive offset (SAO) filtering, adaptive loop filtering (ALF), or other types of loop filtering. Filter unit 64 may apply deblocking filtering to filter block boundaries to remove blockiness artifacts from reconstructed video and may apply other types of filtering to improve overall coding quality. Additional loop filters (in loop or post loop) may also be used.

Video encoder 20 represents one, but not the only, example of a video encoder that may perform the techniques of this disclosure. Video encoder 20, e.g. IBC unit 48, may, for example, encode a slice of video data as an I slice. Video encoder 20 may, for example, perform several coding passes for a coded video sequence and determine that coding the slice as an I slice provides desirable coding characteristics, such as a desirable rate-distortion tradeoff. For the slice, video encoder 20, e.g. IBC unit 48 and entropy encoding unit 56, may also generate an IBC syntax element to indicate that an IBC mode is enabled for the slice. For the slice, video encoder 20, e.g. IBC unit 48, may encode at least one block of the slice using an IBC mode, and video encoder 20, e.g., intra prediction processing unit 46, may encode at least one block of the slice using an intra mode. Video encoder 20, e.g. entropy encoding unit 56, may include the IBC syntax element in an SPS. In response to determining that a number of reference pictures in a reference picture list for the slice of the video data is equal to one and in response to the IBC mode being enabled for the slice, video encoder 20, e.g., prediction processing unit 41, may disable reference picture list modification. As part of disabling reference picture list modification, video encoder 20 may not include reference picture list modification information for the slice in an encoded bitstream.

Figure 4:
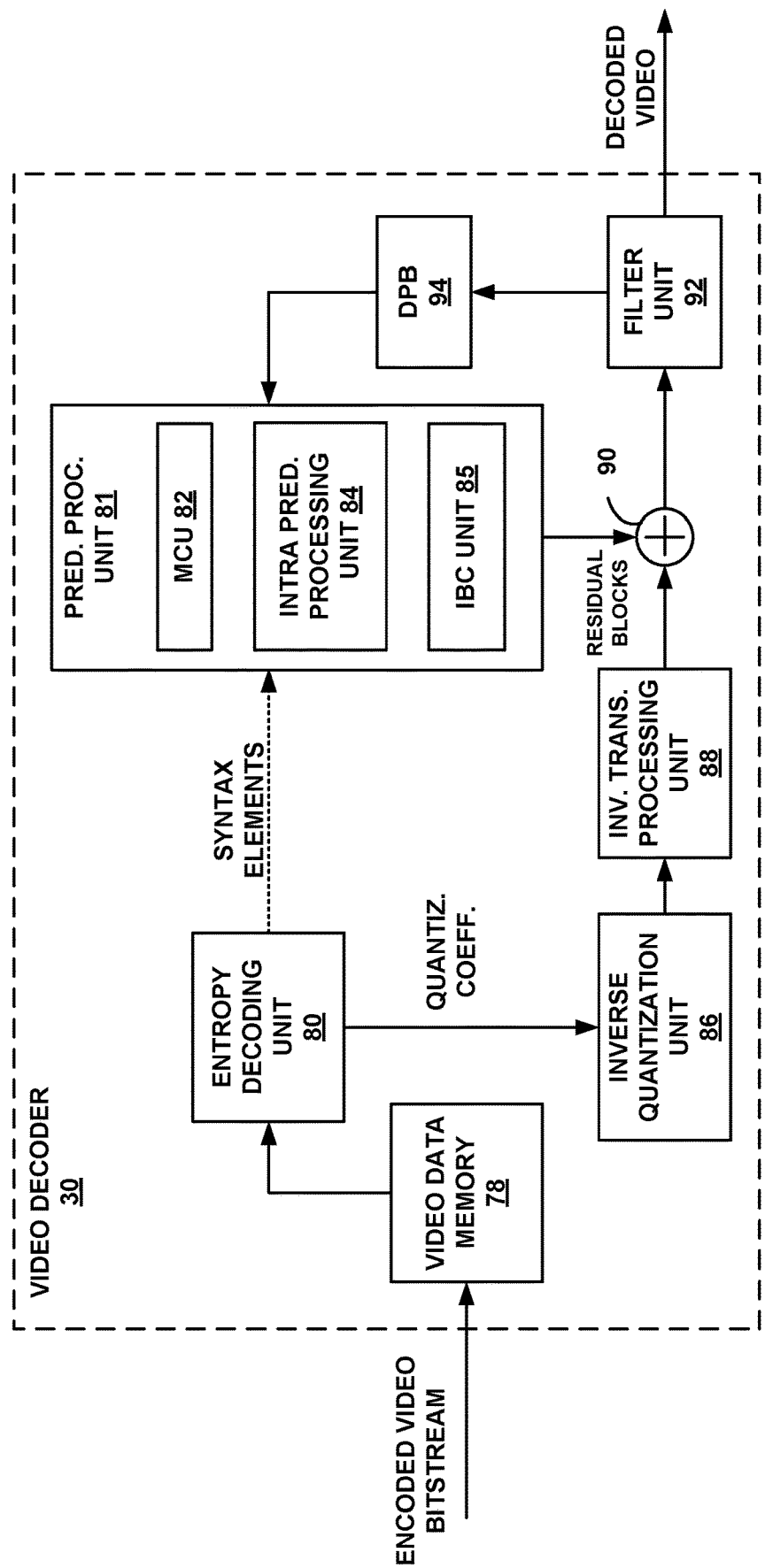
FIG. 4 is a block diagram illustrating an example video decoder that may implement the techniques described in this disclosure.

FIG. 4 is a block diagram illustrating an example video decoder 30 that may implement the techniques described in this disclosure. In the example of FIG. 4, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82, intra prediction processing unit 84, and IBC unit 85. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 and/or IBC unit 85 determine prediction information for a video block of the current video slice by parsing the motion vectors and other syntax elements and use the prediction information to produce the predictive blocks for the current video block being decoded. For example, motion compensation unit 82 uses some of the received syntax elements to determine a prediction mode (e.g., intra- or inter-prediction or IBC) used to code the video blocks of the video slice, construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 and/or IBC unit 85 may also perform interpolation based on interpolation filters. Motion compensation unit 82 and/or IBC unit 85 may use interpolation filters as used by video encoder 20 during encoding of the video blocks to calculate interpolated values for sub-integer pixels of reference blocks. In this case, motion compensation unit 82 and/or IBC unit 85 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. Filter unit 92 filters the reconstructed video block using, for example, one or more of deblocking filtering, SAO filtering, ALF filtering, or other types of filtering. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Video decoder 30 represents one, but not the only, example of a video decoder that may perform the techniques of this disclosure. Video decoder 30, e.g. video data memory 78 and entropy decoding unit 80, may receive a slice of video data. Video decoder 30, e.g. entropy decoding unit 80 and prediction processing unit 81, may parse an IBC syntax element to determine that an IBC mode is enabled for the slice. Video decoder 30, e.g. entropy decoding unit 80 and prediction processing unit 81, may parse a slice type syntax element associated with the slice to determine the slice is an I slice. Video decoder 30, e.g., intra prediction processing unit 84 and IBC unit 85, may decode the slice as an I slice. To decode the slice as an I slice, video decoder 30 may decode blocks of the slice using only intra prediction and without using an inter prediction mode or an IBC mode. Video decoder 30, e.g., entropy decoding unit 80, may receive the IBC syntax element in an SPS. To perform IBC for the at least one block of the slice, video decoder 30, e.g. IBC unit 85, may use a current picture comprising the slice as a reference picture.

Video decoder 30, e.g. prediction processing unit and DPB 94, may, for example, construct a reference picture list for the slice of the video data. A number of pictures included in the reference picture list may be dependent on IBC being enabled. Video decoder 30, e.g. prediction processing unit 81, may construct a reference picture list for the slice of the video data. In response to IBC mode being enabled, video decoder 30, e.g., prediction processing unit and DPB 94, may add the picture containing the slice to the reference picture list.

Video decoder 30, e.g., entropy decoding unit 80 and prediction processing unit 81, may receive a syntax element indicating a number of reference pictures in a reference picture list for the slice of the video data. In response to the syntax element indicating the number of reference pictures in the reference picture list for the slice of the video data is equal to one and in response to the IBC mode being enabled for the slice, video decoder 30, e.g., prediction processing unit and DPB 94, may construct a reference picture list for the slice of the video data that includes a current picture comprising the slice as a first entry in the reference picture list.

Video decoder 30, e.g., entropy decoding unit 80 and prediction processing unit 81, may receive a syntax element indicating a number of reference pictures in a reference picture list for the slice of the video data. In response to the syntax element indicating the number of reference pictures in the reference picture list for the slice of the video data is equal to one and in response to that the IBC mode being enabled for the slice, video decoder 30, e.g., prediction processing unit 81, may disable reference picture list modification. As part of disabling reference picture list modification, video decoder 30, e.g. prediction processing unit 81, may construct the reference picture list without receiving reference picture list modification information.

Figure 5:
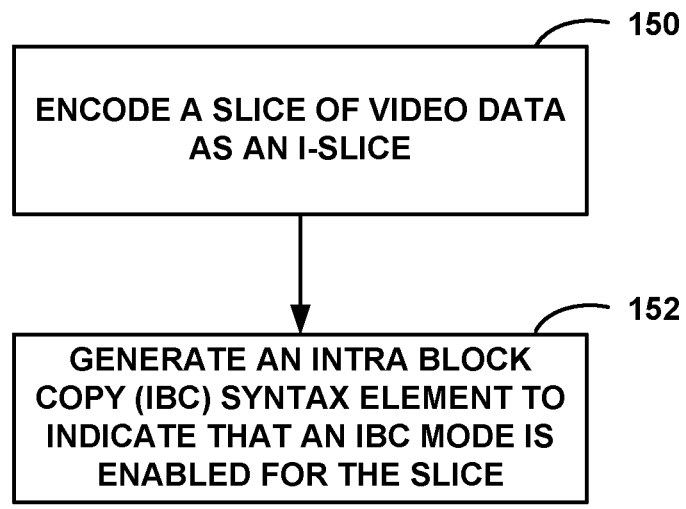
FIG. 5 is a flowchart showing a method of encoding video data in accordance with techniques of this disclosure.

FIG. 5 is a flowchart showing a method of encoding video data in accordance with techniques of this disclosure. FIG. 5 will be described with reference to a generic video encoder. In the example of FIG. 5, the video encoder encodes a slice of video data as an I slice (150). For the slice, the video encoder also generates an IBC syntax element to indicate that an IBC mode is enabled for the slice (152). For the slice, the video encoder may encode at least one block of the slice using an IBC mode and may also encode at least one block of the slice using an intra mode. The video encoder may generate the IBC syntax element for inclusion in an SPS associated with the slice. In response to determining that a number of reference pictures in a reference picture list for the slice of the video data is equal to one and in response to the IBC mode being enabled for the slice, the video encoder may disable reference picture list modification. As part of disabling reference picture list modification, the video encoder may not include reference picture list modification information for the slice in an encoded bitstream.

Figure 6:
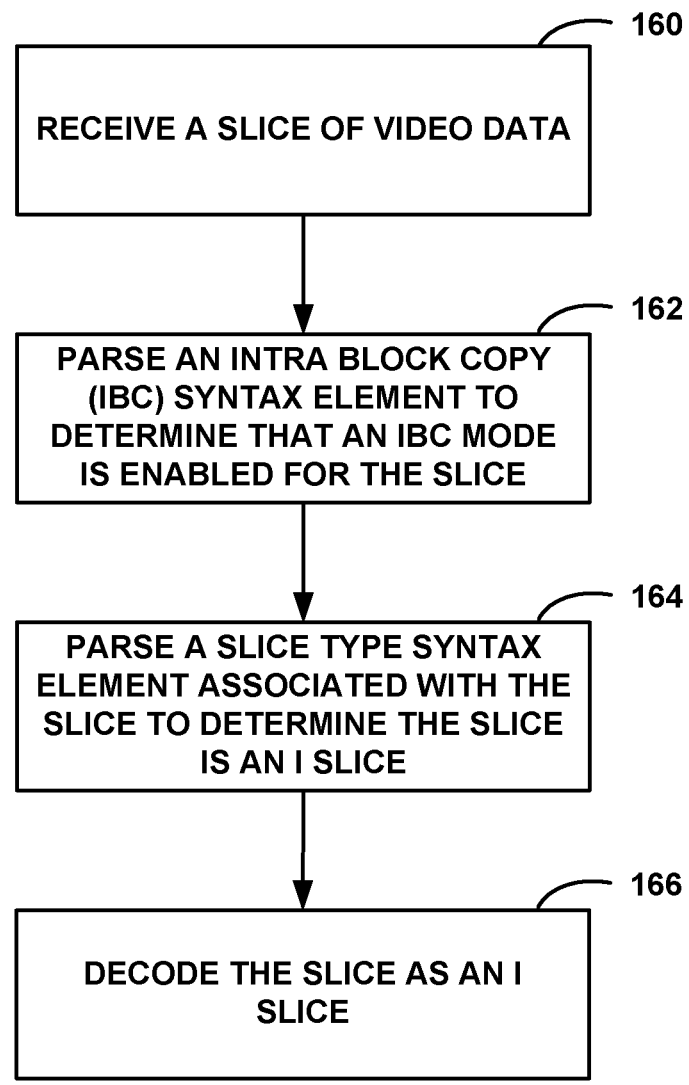
FIG. 6 is a flowchart showing a method of decoding video data in accordance with techniques of this disclosure.

FIG. 6 is a flowchart showing a method of encoding video data in accordance with techniques of this disclosure. FIG. 6 will be described with reference to a generic video decoder. The generic video decoder may, for example, correspond to video decoder 30, although the techniques of this disclosure are not limited to any specific type of video decoder. The video decoder receives a slice of video data (160). The video decoder parses an IBC syntax element to determine that an IBC mode is enabled for the slice (162). The video decoder parses a slice type syntax element associated with the slice to determine the slice is an I slice (164). The video decoder decodes the slice as an I slice (166). To decode the slice as an I slice, the video decoder may, for example, decode all blocks of the slice using intra prediction coding modes. The video decoder may receive the IBC syntax element in an SPS. To decode the slice as an I slice, the video decoder decodes blocks of the slice using only intra prediction. In other words, to decode the slice as an I slice, the video decoder decodes blocks of the slice without using an inter prediction mode and without using the IBC mode.

The IBC syntax element may, for example, be the curr_pic_as_ref_enabled_flag described above, and to parse the IBC syntax element to determine that the IBC mode is enabled for the slice, the video decoder may determine the value of the curr_pic_as_ref_enabled_flag to be equal to 1. The slice type syntax element may, for example, be the slice_type syntax element described above, and to parse the slice type syntax element associated with the slice to determine the slice is an I slice, the video decoder may determine the value of the slice_type syntax element to be equal to 2.

In accordance with the example of FIG. 6, the video decoder may also receive a second slice of the video data, receive a syntax element indicating a number of reference pictures in a reference picture list for the second slice of the video data, and in response to the syntax element indicating the number of reference pictures in the reference picture list for the second slice of the video data being equal to one and in response to the IBC mode being enabled for the second slice, the video decoder may construct a reference picture list for the second slice of the video data that includes a current picture comprising the slice. In another example, the video decoder may receive a second slice of the video data, construct a reference picture list for the second slice of the video data, and in response to IBC mode being enabled, add the picture containing the second slice to the reference picture list.

Figure 7:
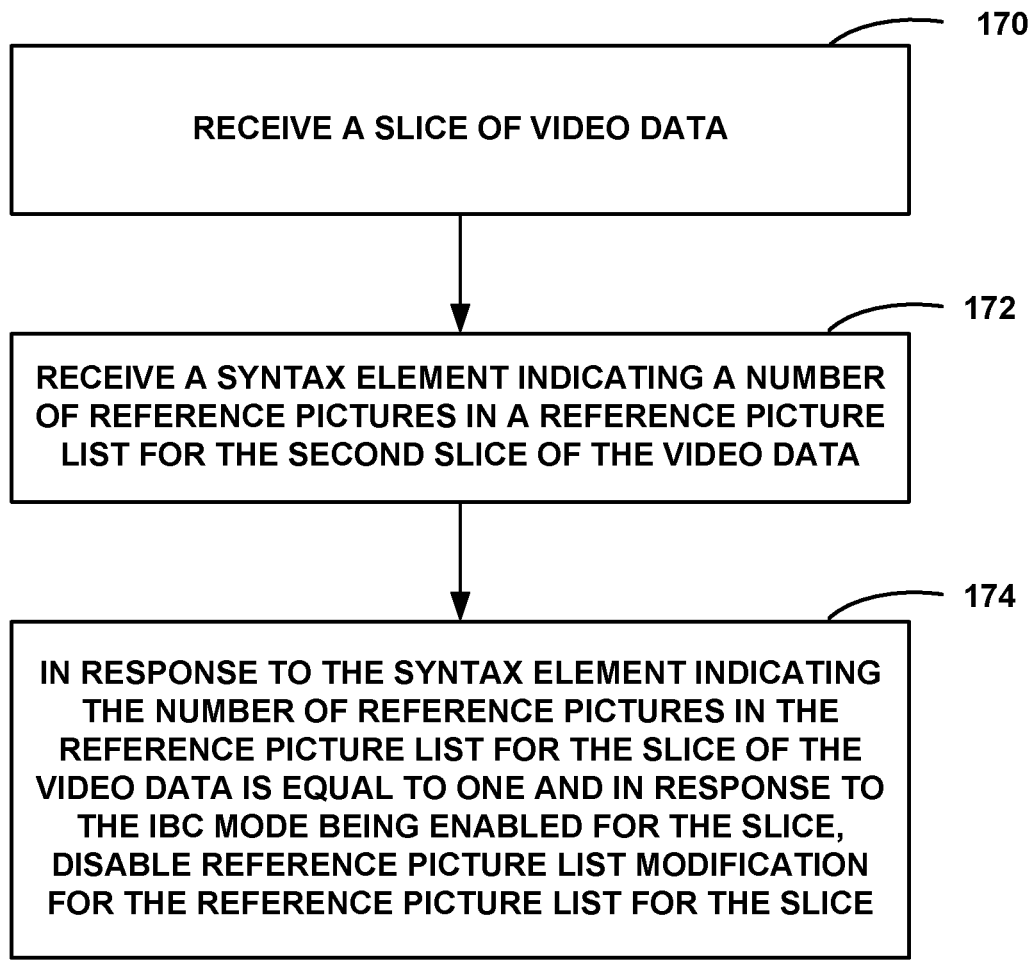
FIG. 7 is a flowchart showing a method of decoding video data in accordance with techniques of this disclosure.

FIG. 7 is a flowchart showing a method of encoding video data in accordance with techniques of this disclosure. FIG. 7 will be described with reference to a generic video decoder. The techniques of FIG. 7 may be used in conjunction with the techniques of FIG. 6 or may be used independently. The generic video decoder may, for example, correspond to video decoder 30, although the techniques of this disclosure are not limited to any specific type of video decoder. The video decoder receives a slice of video data (170). The video decoder receives a syntax element indicating a number of reference pictures in a reference picture list for the slice of the video data (172). In response to the syntax element indicating the number of reference pictures in the reference picture list for the slice of the video data is equal to one and in response to the IBC mode being enabled for the second slice, the video decoder disables reference picture list modification for the reference picture list for the second slice (174). To disable reference picture list modification, the video decoder may, for example, construct the reference picture list without receiving reference picture list modification information and add current picture comprising the slice as a first entry in the reference picture list.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, including fixed function and/or programmable processing circuitry, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
    receiving a first slice of a current picture of the video data;
    receiving a syntax element indicating a number of reference pictures in a reference picture list for the first slice of the video data;
    determining that an intra block copy (IBC) mode is enabled for the first slice; and
    determining that the number of reference pictures in the reference picture list is equal to 1;
    determining that information associated with modification of the reference picture list is not signaled in the video data;
    responsive to the number of reference pictures in the reference picture list being equal to 1, the determination that the IBC mode is enabled for the first slice, and the determination that information associated with modification of the reference picture list is not signaled in the video data, adding the current picture comprising the first slice to the reference picture list during construction of the reference picture list.

2. The method of claim 1, further comprising:
    responsive to the determination that the number of reference pictures in the reference picture list is the value equal to 1, adding the current picture comprising the first slice as a first entry in the reference picture list.

3. The method of claim 1, further comprising:
    receiving a second slice of a current picture of the video data;
    parsing an IBC syntax element to determine that an IBC mode is enabled for the second slice;
    parsing a slice type syntax element associated with the second slice to determine that the second slice is an I slice;
    decoding the second slice as an I slice, wherein decoding the second slice as an I slice comprises decoding all blocks of the second slice using at least one intra prediction coding mode,
    wherein the IBC syntax element comprises a curr_pic_as_ref_enabled_flag syntax element, and wherein parsing the IBC syntax element to determine that the IBC mode is enabled for the second slice comprises determining the value of the curr_pic_as_ref_enabled_flag syntax element is equal to 1.

4. The method of claim 3, wherein decoding the second slice as an I slice comprises decoding blocks of the second slice using only intra prediction.

5. The method of claim 3, wherein decoding the second slice as an I slice comprises decoding blocks of the second slice without using an inter prediction mode and without using the IBC mode.

6. The method of claim 3, wherein the slice type syntax element comprises a slice_type syntax element, and wherein parsing the slice type syntax element associated with the second slice to determine the second slice is an I slice comprises determining the value of the slice_type syntax element is equal to 2.

7. A device for decoding video data, the device comprising:
    a memory configured to store the video data; and
    one or more processors configured to:
        receive a first slice of a current picture of the video data;
        receive a syntax element indicating a number of reference pictures in a reference picture list for the first slice of the video data;
        determine that an intra block copy (IBC) mode is enabled for the first slice;
        determine that the number of reference pictures in the reference picture list is equal to 1;
        determine that information associated with modification of the reference picture list is not signaled in the video data; and
        responsive to the number of reference pictures in the reference picture list being equal to 1, the determination that the IBC mode is enabled for the first slice, and the determination that information associated with modification of the reference picture list is not signaled in the video data, add the current picture comprising the first slice to the reference picture list during construction of the reference picture list.

8. The device of claim 7, wherein the one or more processors are further configured to:
responsive to the determination that the number of reference pictures in the reference picture list is the value equal to 1, add the current picture comprising the first slice as a first entry in the reference picture list.

9. The device of claim 7, wherein the one or more processors are further configured to:
receive a second slice of a current picture of the video data;
parse an IBC syntax element to determine that an IBC mode is enabled for the second slice;
parse a slice type syntax element associated with the second slice to determine that the second slice is an I slice;
decode the second slice as an I slice, wherein to decode the second slice as an I slice, the one or more processors are further configured to decode all blocks of the second slice using at least one intra prediction coding mode,
wherein the IBC syntax element comprises a curr_pic_as_ref_enabled_flag syntax element, and wherein to parse the IBC syntax element to determine that the IBC mode is enabled for the second slice, the one or more processors are further configured to determine the value of the curr_pic_as_ref_enabled_flag syntax element is equal to 1.

10. The device of claim 9, wherein to decode the second slice as an I slice, the one or more processors are further configured to decode blocks of the second slice using only intra prediction.

11. The device of claim 9, wherein to decodes the second slice as an I slice, the one or more processors are further configured to decode blocks of the second slice without using an inter prediction mode and without using the IBC mode.

12. The device of claim 9, wherein the slice type syntax element comprises a slice_type syntax element, and wherein to parse the slice type syntax element associated with the second slice to determine the second slice is an I slice, the one or more processors are further configured to determine the value of the slice_type syntax element is equal to 2.

13. The device of claim 7, wherein the device comprises at least one of:
an integrated circuit;
a microprocessor; or
a wireless communication device that comprises a receiver configured to receive encoded video data.

14. An apparatus for decoding video data, the apparatus comprising:
means for receiving a first slice of a current picture of the video data;
means for receiving a syntax element indicating a number of reference pictures in a reference picture list for the first slice of the video data;
means for determining that an intra block copy (IBC) mode is enabled for the first slice;
means for determining that the number of reference pictures in the reference picture list is equal to 1;
means for determining that information associated with modification of the reference picture list is not signaled in the video data; and
means for adding the current picture comprising the slice to the reference picture list during construction of the reference picture list responsive to the number of reference pictures in the reference picture list being equal to 1, the determination that the IBC mode is enabled for the first slice, and the determination that information associated with modification of the reference picture list is not signaled in the video data.

15. The apparatus of claim 14, further comprising:
responsive to the determination that the number of reference pictures in the reference picture list is the value equal to 1, means for adding the current picture comprising the first slice as a first entry in the reference picture list.

16. The apparatus of claim 14, further comprising:
means for receiving a second slice of a current picture of the video data;
means for parsing an IBC syntax element to determine that an IBC mode is enabled for the second slice;
means for parsing a slice type syntax element associated with the second slice to determine that the second slice is an I slice;
means for decoding the second slice as an I slice, wherein the means for decoding the second slice as an I slice comprises means for decoding all blocks of the second slice using at least one intra prediction coding mode,
wherein the IBC syntax element comprises a curr_pic_as_ref_enabled_flag syntax element, and wherein the means for parsing the IBC syntax element to determine that the IBC mode is enabled for the second slice comprises means for determining the value of the curr_pic_as_ref_enabled_flag syntax element is equal to 1.

17. A non-transitory, computer readable storage medium storing instructions that when executed by one or more processors cause the one or more processors to:
receive a first slice of a current picture of the video data;
receive a syntax element indicating a number of reference pictures in a reference picture list for the first slice of the video data;
determine that an intra block copy (IBC) mode is enabled for the first slice;
determine that the number of reference pictures in the reference picture list is equal to 1;
determine that information associated with modification of the reference picture list is not signaled in the video data; and
responsive to the number of reference pictures in the reference picture list being equal to 1, the determination that the IBC mode is enabled for the first slice, and the determination that information associated with modification of the reference picture list is not signaled in the video data, add the current picture comprising the first slice to the reference picture list during construction of the reference picture list.

18. The non-transitory, computer readable storage medium of claim 17, further storing instructions that when executed by one or more processors cause the one or more processors to:
responsive to the determination that the number of reference pictures in the reference picture list is the value equal to 1, add the current picture comprising the first slice as a first entry in the reference picture list.

19. The non-transitory, computer readable storage medium of claim 17, further storing instructions that when executed by the one or more processors cause the one or more processors to:

receive a second slice of the video data;

parse an IBC syntax element to determine that an IBC mode is enabled for the second slice;

parse a slice type syntax element associated with the second slice to determine that the second slice is an I slice;

decode the second slice as an I slice, wherein to decode the second slice as an I slice, the one or more processors decode all blocks of the second slice using at least one intra prediction coding mode, wherein the IBC syntax element comprises a curr_pic_as_ref_enabled_flag syntax element, and wherein to parse the IBC syntax element to determine that the IBC mode is enabled for the second slice, the instructions cause the one or more processors to determine the value of the curr_pic_as_ref_enabled_flag syntax element is equal to 1.

* * * * *